(No Model.)
J. C. RICHARDSON.
METHOD OF MAKING NUT LOCKS.
No. 432,081. Patented July 15, 1890.
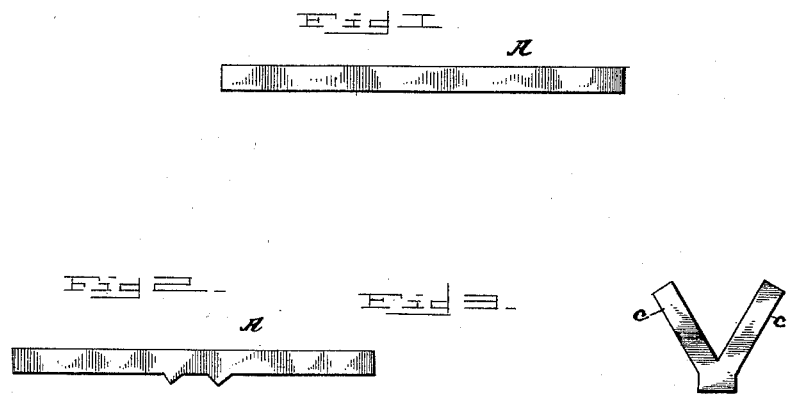
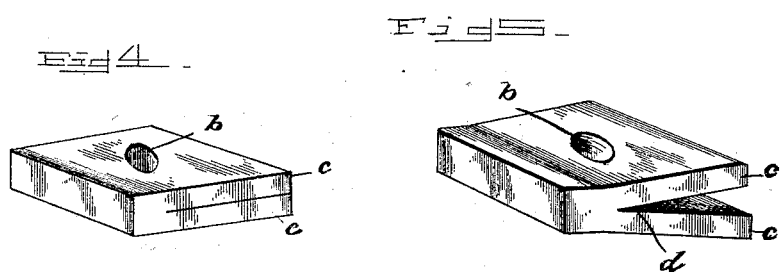

UNITED STATES PATENT OFFICE.

JULIUS C. RICHARDSON, OF SHARPSBURG, PENNSYLVANIA.

METHOD OF MAKING NUT-LOCKS.

SPECIFICATION forming part of Letters Patent No. 432,081, dated July 15, 1890.

Application filed August 9, 1889. Serial No. 320,240. (No model.)

*To all whom it may concern:*

Be it known that I, JULIUS C. RICHARDSON, a citizen of the United States of America, residing at Sharpsburg, in the county of Allegheny and State of Pennsylvania, have invented certain new and useful Improvements in the Method of Making Nut-Locks, of which the following is a specification, reference being had therein to the accompanying drawings.

My invention pertains to certain improvements in the process or method of forming nuts for bolts; and it comprises the means substantially as hereinafter fully set forth.

In the accompanying drawings, Figures 1, 2, 3, 4, and 5 are views showing the various steps in effecting my invention.

In carrying out my invention I take a bar of metal, as A, of the desired texture, and first roll the same into the shape or form shown in Fig. 2. The bar is then further rolled or subjected to the action of a series of different-shaped rollers, causing the same to have, respectively, the forms shown in Fig. 3 and also in Fig. 4. The nuts are then cut out of the bar, and in each a hole or aperture is punched, cold or hot, which aperture is screw-threaded, as shown in Fig. 5, and the arms $c$ $c$ are then forced apart by means of a wedge-shaped piece of metal, forming an approximately V-shaped recess or opening $d$. (Shown in Fig. 5.)

It will be seen that by means of my invention a nut of the desired form is readily, cheaply, and easily made; that the thread of the aperture $b$ is uniform in both arms $c$ $c$, and will serve to firmly bind and hold the same in position.

Having thus fully described my invention, what I claim, and desire to secure by Letters Patent, is—

1. The improvement in the process or method of making nuts herein described, the same consisting in bending the arms of a bar against each other, forming threaded apertures therethrough, and then separating said arms, substantially as described.

2. The improvement in the process or method of making nuts herein described, the same consisting in bending the arms of a bar against each other, cold-punching apertures therein, which are afterward threaded, and then separating said arms so that the same form a V-shaped slot, substantially as described.

In testimony whereof I affix my signature in presence of two witnesses.

JULIUS C. RICHARDSON.

Witnesses:
JNO. F. NEVES,
JNO. C. REILLY.